(12) United States Patent
Schmalz

(10) Patent No.: US 9,433,147 B2
(45) Date of Patent: Sep. 6, 2016

(54) VERTICALLY STORABLE ENGINE AND MOWER

(75) Inventor: Jacob J. Schmalz, Milwaukee, WI (US)

(73) Assignee: Briggs & Stratton Corporation, Wauwatosa, WI (US)

(*) Notice: Subject to any disclaimer, the term of this patent is extended or adjusted under 35 U.S.C. 154(b) by 823 days.

(21) Appl. No.: 13/288,027

(22) Filed: Nov. 3, 2011

(65) Prior Publication Data

US 2013/0111867 A1    May 9, 2013

(51) Int. Cl.
| | |
|---|---|
| A01D 34/52 | (2006.01) |
| A01D 34/81 | (2006.01) |
| A01D 34/82 | (2006.01) |
| F01M 11/04 | (2006.01) |
| F02M 37/00 | (2006.01) |
| F01M 11/06 | (2006.01) |
| F02B 75/00 | (2006.01) |
| F02B 75/16 | (2006.01) |

(52) U.S. Cl.
CPC .............. *A01D 34/81* (2013.01); *A01D 34/82* (2013.01); *F01M 11/0458* (2013.01); *F02M 37/007* (2013.01); *F01M 11/065* (2013.01); *F02B 75/007* (2013.01); *F02B 75/16* (2013.01); *F02B 2275/30* (2013.01)

(58) Field of Classification Search
CPC ...................................... A01D 34/81
USPC .................................... 56/255, 11.9
See application file for complete search history.

(56) References Cited

U.S. PATENT DOCUMENTS

| | | | | |
|---|---|---|---|---|
| 2,090,197 | A * | 8/1937 | Haas et al. | 220/86.2 |
| 3,038,737 | A * | 6/1962 | Etchison | 280/655.1 |
| 3,955,653 | A * | 5/1976 | Comer | 188/273 |
| 5,261,215 | A | 11/1993 | Hartz et al. | |
| 8,573,183 | B2 * | 11/2013 | Graham et al. | 123/434 |
| 2005/0188664 | A1 | 9/2005 | Clarke | |
| 2011/0088362 | A1 | 4/2011 | Rosa et al. | |

FOREIGN PATENT DOCUMENTS

| | | |
|---|---|---|
| EP | 1561372 | 8/2005 |
| EP | 1731016 | 12/2006 |

OTHER PUBLICATIONS

Partial European Search Report for EP 12191137 dated Jan. 31, 2013.
Grass Cutting Catalogue, Al-Ko, pp. 34-35 (2011).
Safety Instructions & Operators Manual for Snapper Rear Engin Riding Mower Series 23 (2004).

* cited by examiner

*Primary Examiner* — Thomas B Will
*Assistant Examiner* — Mai Nguyen
(74) *Attorney, Agent, or Firm* — Rathe Lindenbaum LLP

(57) ABSTRACT

A gas powered walk behind mower is configured to be stored in a vertical position or orientation without leaking contained engine fluids.

27 Claims, 13 Drawing Sheets

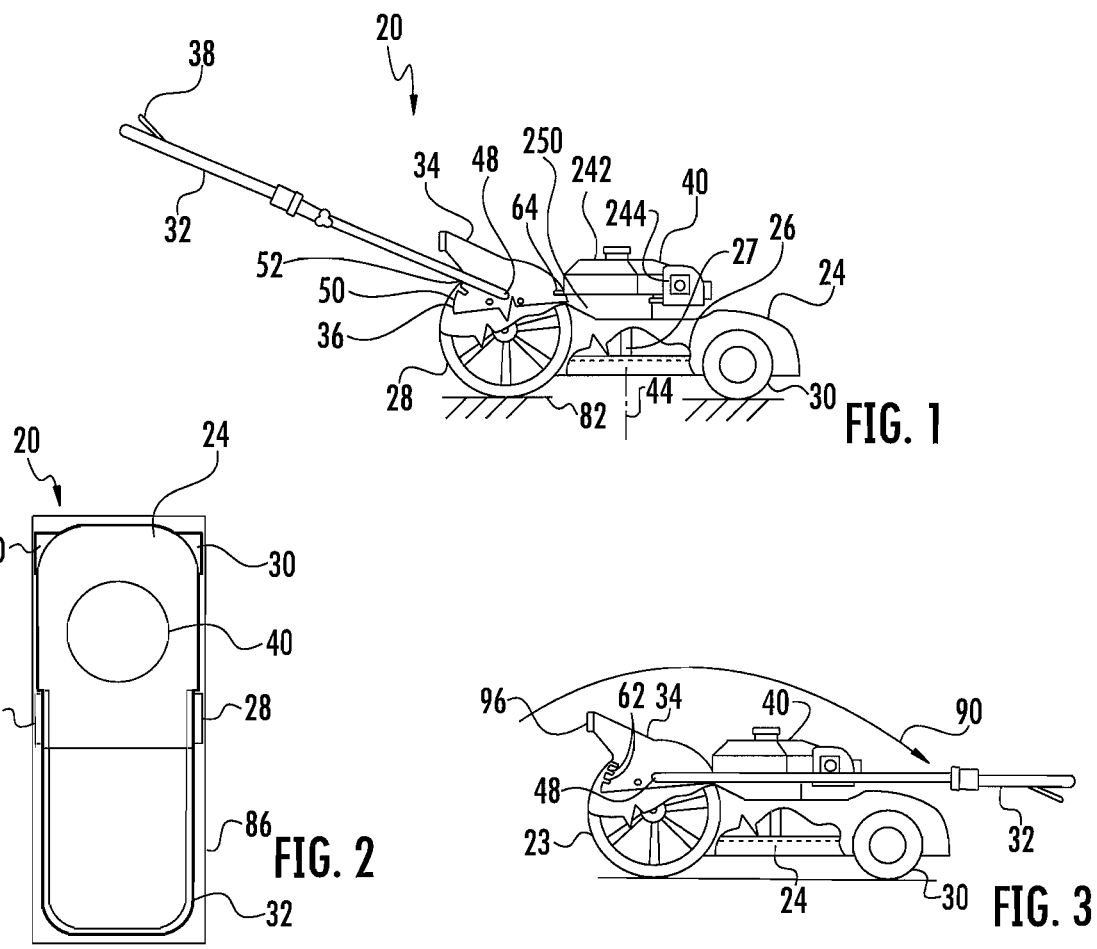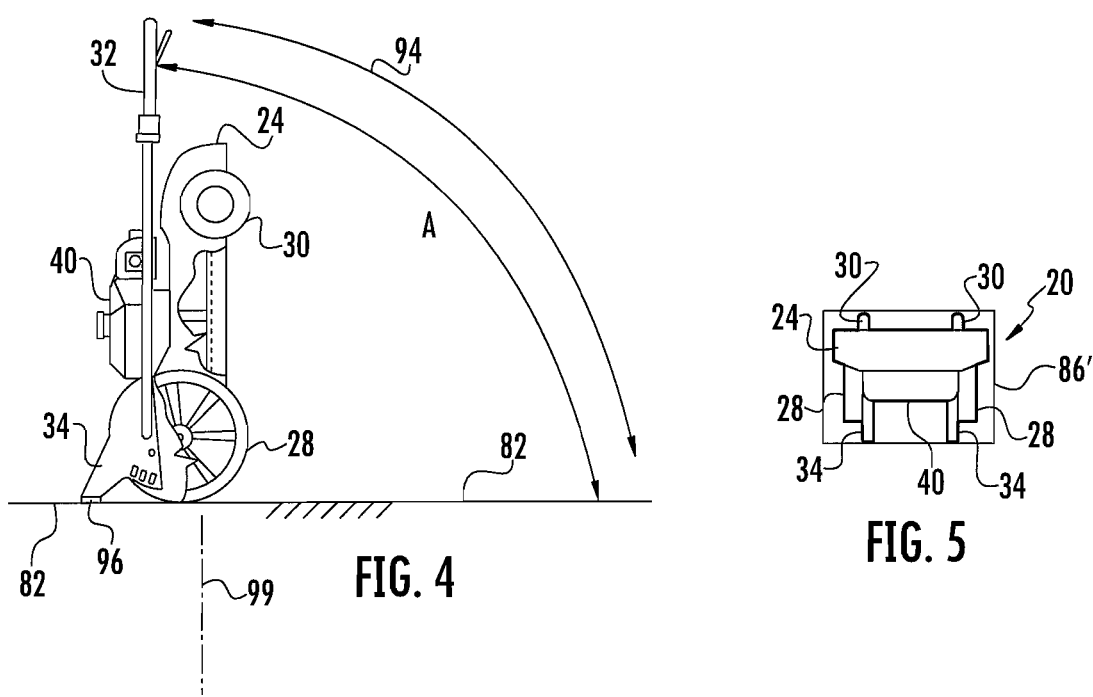

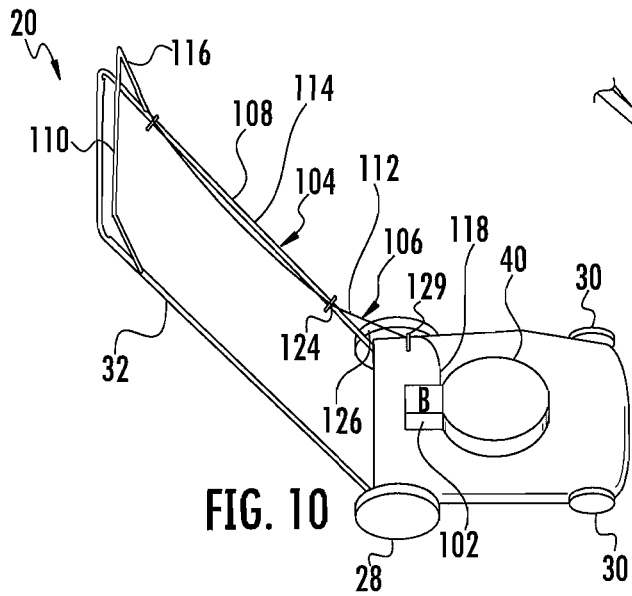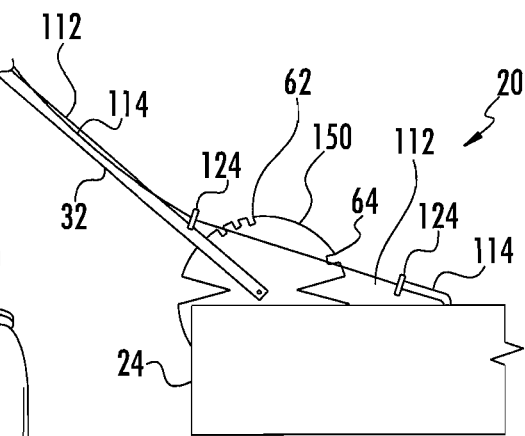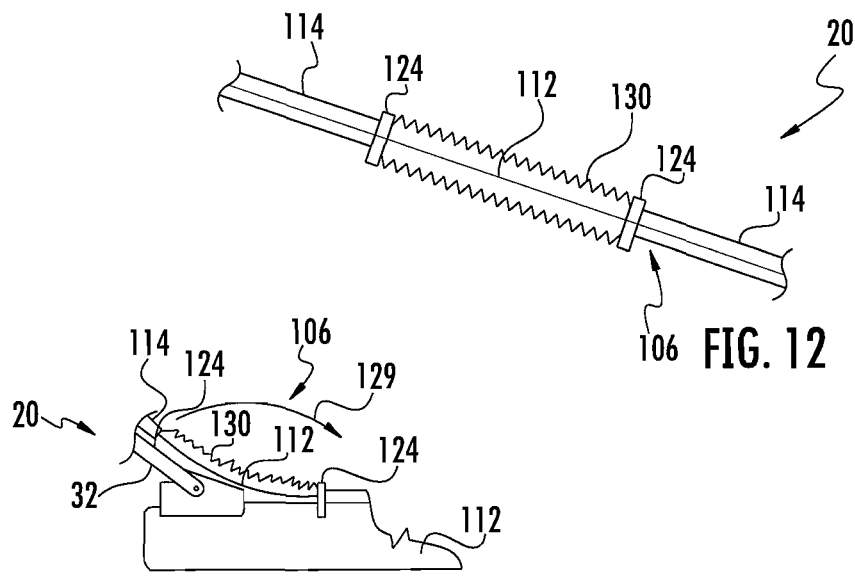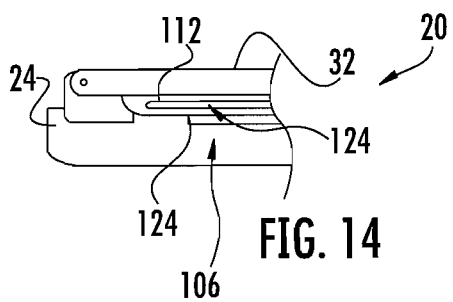

VERTICALLY STORABLE ENGINE AND MOWER

BACKGROUND

Walk behind mowers include a deck which supports and surrounds a cutting blade. It is this deck that consumes valuable space when the mower is stored.

BRIEF DESCRIPTION OF THE DRAWINGS

FIG. 1 is a side elevational view of an example gas powered vertically storable walk behind mower in an operating orientation.

FIG. 2 the top plan view of the mower of FIG. 1 illustrating a first footprint of the mower while in the operating orientation.

FIG. 3 is a side elevational view of the mower of FIG. 1 with a handle in a folded state.

FIG. 4 is a side elevational view of the mower of FIG. 1 pivoted to an example vertical storage orientation.

FIG. 5 is a top plan view of the mower of FIG. 4 illustrating a second footprint of the mower while in the storage orientation.

FIG. 10 is a top perspective view of an example braking system of the mower of FIG. 1.

FIG. 11 is a fragmentary side elevational view of the braking system of FIG. 10.

FIG. 12 is a fragmentary side elevational view of an example brake release disabler of the braking system of FIG. 10.

FIG. 13 is a fragmentary side elevational view of the braking system of FIG. 10 illustrating disabling of a brake release in response to folding up the handle.

FIG. 14 is a fragmentary side elevational view of the braking system of FIG. 10 illustrating disabling of the brake release upon completion of folding of the handle.

DETAILED DESCRIPTION OF THE EXAMPLE EMBODIMENTS

Figure 6:
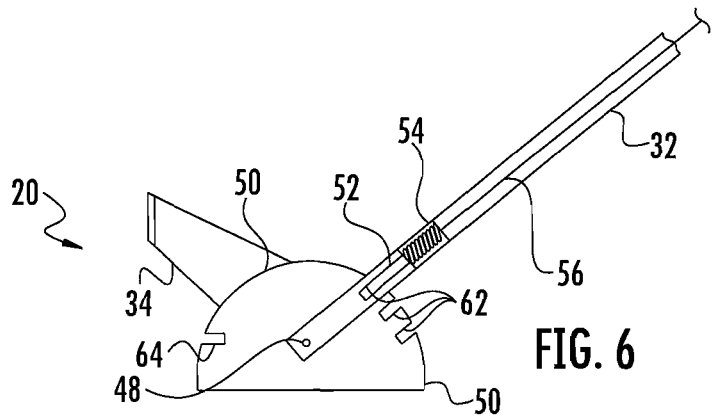
FIG. 6 is a side elevational view of an example handle latching system of the mower of FIG. 1.

FIG. 1 illustrates an example gas powered walk behind mower 20. As will be described hereafter, mower 20 is vertically storable, allowing mower 20 to consume less floor space when stored. As will be described hereafter, mower 20 is configured so as to not leak engine fluids while being vertically stored. As will be described hereafter, mower 20 is configured to facilitate intentional draining of oil while in the stored position. Walk behind mower 20 comprises deck 24, cutting blade 26, rear wheels 28, front wheels 30, handle 32, feet 34, handle latching system 36, blade braking system 38 and gas powered engine 40.

Deck 24 comprises one or more structures serving as a base, support and the blade shield. Deck 24 serves as a base upon which engine 38 is mounted. Deck 24 supports wheels 28, 30, handle 32, feet 34 and latching system 36. Deck 24 further partial least surrounds and shields cutting blade 26. Deck 24 may have a variety different sizes, shapes and configurations.

Cutting blade 26 comprises one or more blades configured to be rotationally driven by engine 40 about a substantially vertical axis 44 when cutting grass. Rear wheels 28 and front wheels 30 comprise a pair front wheels and a pair of rear wheels coupled to and supported by deck 24 so as to rollably support deck 24 for movement over a terrain while cutting grass. Rear wheels 28 have a diameter and are rotatably supported by deck 24 so as to maintain contact with the ground when deck 24 is being flipped to a vertical orientation. In the example illustrated, rear wheels 28 have a diameter greater than a diameter front wheels 30. In other embodiments, rear wheels 28 and front wheels 30 may have the same or different sizes. In one embodiment, each of rear wheels 28 and front wheels 30 freely idle, not being driven, wherein mower 20 is a push mower. In another embodiment, one or both of rear wheels 28 and front wheels 38 are driven by a transmission powered by engine 40, wherein mower 20 is a self-propelled mower.

Handle 32 comprises one or more members extending from deck 24 by which allow a person to steer or direct mower 20. In embodiments where mower 20 is a push mower, handle 32 further facilitates pushing of mower 20. Handle 20 is pivotably coupled to deck 24 for pivotal movement about a pivot axis 48, allowing handle 32 to pivot between one or more operational positions, such as shown in FIG. 1 and a storage position shown in FIG. 3. In one example, handle 32 comprises an inverted U-shaped bar extending from two lateral side portions of deck 24. In another embodiment, handle 32 may comprise a T-shaped bar or may have other shapes or configurations.

Feet 34 comprise a pair of spaced projections configured to extend into contact with an underlying ground or other terrain while propping mower 20 and deck 24 in a vertical orientation. In one implementation, feet 34 extends from deck 24 or are fixed with respect to deck 24. In another embodiment, feet 34 comprise portions of handle 32. Although mower 20 is illustrated as having a pair of laterally spaced feet 34, in other implementations, mower 20 may have a single foot rearwardly projecting from deck 24 or more than two feet projecting from deck 24.

Figure 7:
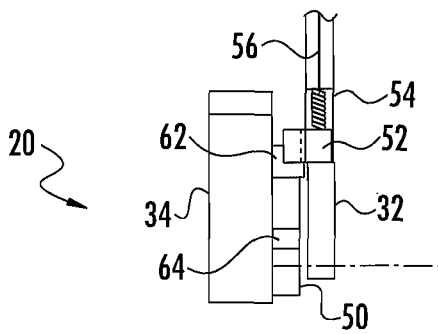
FIG. 7 is a front elevational view of the handle latching system of FIG. 6.
Figure 8:
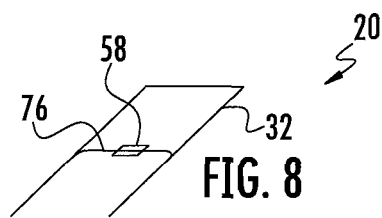
FIG. 8 is a schematic illustration of a handle and a portion of the handle latching system of the mower of FIG. 1.

Handle latching system 36 comprises a mechanism configured to secure and retain handle 32 in one of a plurality of operational positions (positions at which users steer during mowing) as well as in a storage position (a position in which handle 32 extends substantially parallel to deck 24 in a folded or collapsed state). FIGS. 6-9 illustrate handle latching system 36 in more detail. Handle latching system 36 comprises brackets 50, projection 52, biases 54, wires 56 and actuator 58. In the implementation illustrated, each end of handle 32 is retained by a bracket 50, a projection 52, a bias 54 and a wire 56. For ease of illustration, only one bracket 50, projection 52, bias 54, wire 56 and actuator 58 is shown in FIGS. 6 and 7. In the implementation shown, actuator 58 simultaneously actuates both projections 52 with respect to both brackets 50 on opposite lateral sides of mower 50. In other embodiments, a separate actuator 58 may be provided for each projection and bracket 50.

Each bracket 50 comprises a member along which handle 32 pivots and provides operational detents 62 and a storage detent 64. Detents 62 and 64 comprise notches in bracket 50 arranged along an arcuate or curved edge of bracket 50 which has a radius centered at a rotational axis 48 of handle 32. Detents 62 generally face in a rearward direction from deck 24 and extend at spaced locations defining different angles for handle 32 with respect to deck 24 during operation or mowing. Detent 64 comprises a notch generally facing in a forward direction towards a front of mower 20 at a location for securement of handle 32 in a collapsed state substantially parallel to an adjacent to deck 24. Each of detents 62, 64 are configured to receive projection 52.

In the example illustrated, each bracket 50 is integrally formed as a single unitary body with the adjacent foot 34. In one embodiment, each bracket 50 and integral foot 34 is formed from a single stamped piece of metal. In other embodiments, brackets 50 and feet 34 may comprise separate structures separately mounted to deck 24.

Figure 9:
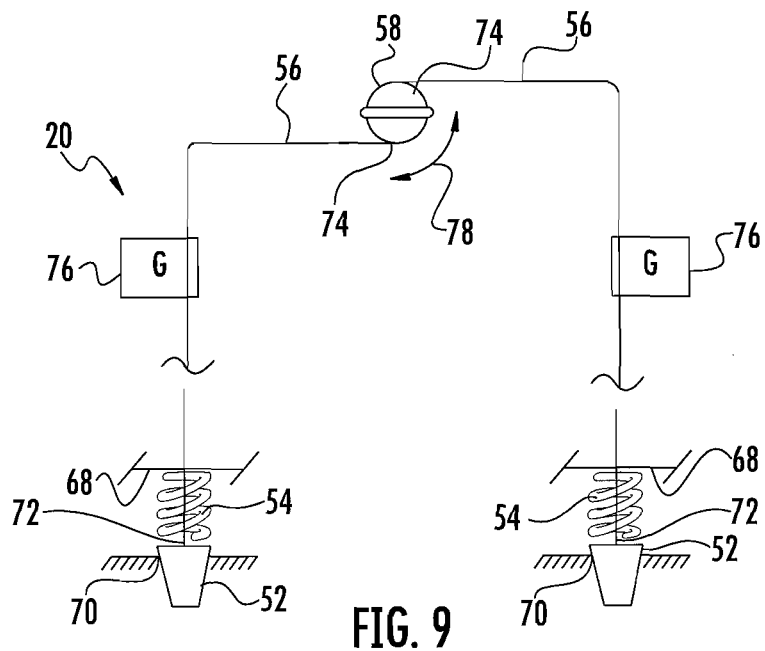
FIG. 9 is a schematic illustration of an example actuator of the handle latching system of FIG. 6.

Each projection 52 each comprise a wedge, pin, bar, rod or other structure configured to move between a detent engaging position and a withdrawn position. In the implementation illustrated, projection 52 is slidably supported by handle 32 for movement between the detent engaging position and the withdrawn position. Projection 52 is resiliently biased towards the detent engaging position by bias 54. As schematically shown by FIG. 9, handle 32 includes a shoulder 68 and an opening 70 through which projection 52 may partially project, wherein bias 54 comprises a compression spring captured between projection 52 and shoulder 68 to bias projection 52 into abutment with opening 70 and into a detent 62, 64 when projection 52 is angularly aligned with such a detent 62, 64.

Each wire 54 comprises an elongate flexible member of a single strand or multiple strands (sometimes referred to as a cable or a Bowden cable) having a first end 72 connected to projection 52, an intermediate portion passing through a guide 76, such as a sheath, and a second ends 74 are connected to actuator 58. Wire 54 transmits force or motion imparted upon wire 54 by actuator 58 to projections 52 to move projections 52 against bias 54 to the withdrawn position.

Actuator 58 (shown in FIGS. 8 and 9) comprises a manually actuatable mechanism configured to impart motion or force to wire 56 so as to move projections 52 between the detent engaging position and the withdrawn position. In the example illustrated, actuator 58 comprises a handle on a cross bar 76 that upon being twisted in either of the directions indicated by arrows 78 pulls upon both wires 56 to move projection 52 against bias 54 from the detent engaging position to the withdrawn position. In other implementations, other mechanisms may be used to move projections 52. For example, actuator 58 may comprise a pair of levers connected to ends 74 of wires 56, wherein the levers pull on each of wires 56 to move projections 52 upon such levers being squeezed.

FIGS. 1-5 illustrate the folding and latching of handle 32 by handle latching system 36 for storage of mower 20 in a vertical orientation. As shown by FIGS. 1 and 2, in the operating orientation, handle 32 projects or extend rearwardly from deck 24 and deck 24 extend substantially horizontal with both rear wheels 28 at front wheels 30 resting or extending into close proximity with the underlying terrain 82. In this orientation, mower 20 has a footprint 86 represented by the rectangle shown in FIG. 2.

FIG. 3 illustrates the collapsing of handle 32. To collapse handle 32, actuator 58 is actuated to pull on wires 56 to move projections 52 against bias 54 from detent engaging positions in which projection 52 project into one of operational detents 62 to withdrawn positions. Once projections 52 unlatched, handle 32 may pivot about axis 48 in a forward direction, as indicated by arrow 90, towards front wheels 30. Once projections 52 are aligned with storage projections 64 in each of the side brackets 50, actuator 58 is released, allowing biases 54 to move projections 52 to detent engaging positions in which projections 52 project into detents 64 to effectively lock handle 32 against or in close proximity with an upper surface of deck 24, substantially parallel to deck 24.

FIG. 4 further illustrates the lifting of mower 20 from a horizontal orientation to a vertical orientation for storing. In particular, the end of handle 32 may be manually grasped and lifted to pivot mower 20 about the axle of rear wheels 28 in the direction indicated by arrow 94 until sole 96 of feet 34 contact floor or terrain 82. Because handle 32 is mechanically locked by latching 36, as compared to being merely gripped by claw or resilient clasp, handle 32 is securely retained in place and may be used to reliably lift mower 20 to the vertical orientation shown in FIG. 4. In other implementations, other mechanisms may be utilized to lock, as compared to merely gripping, handle 32. In other implementations, handle 32 may be locked with respect to deck 24 by securement structures along deck 24. In yet other implementations, deck 24 may alternatively utilize resilient claws, wherein mower 20 gripped at other locations the size handle 32 when being lifted.

Because latch system 36 facilitates the release or locking of handle 32 relative to deck 24 by actuator 58 carried by handle 32, releasing handle 32 for pivotal movement may be facilitated while the user is behind mower 20. Because actuator 58 releases both side projections 52 simultaneously, releasing handle 32 for pivotal movement may be achieved in a single motion. In other implementations, separate actuators on each side of mower 20 may be employed Because handle 32 extends forward of front wheels 30 and forward of deck 24, handle 32 provides a relatively long lever arm (the distance between the end of handle 32 and the axle of rear wheel 28) for lifting mower 20; the longer lever arm facilitating easier lifting of mower 20. In the example illustrated, are configured such that plane 99 of deck 24 (extending parallel to blade 26 and perpendicular to drive shaft 27 of blade 26) is angularly spaced from support surface 82 by an angle A of between 60 degrees and 120 degrees, and nominally greater than 90 degrees but less than 110 degrees. In the embodiment shown, plane 99 of deck 24 is supported by feet 34 such that the center of mass of mower 20 is between sole 96 of feet 34 and the axle of rear wheels 28, reducing the likelihood of mower 20 tipping. In those implementations in which feet 34 support plane 99 of deck 24 at an angle A of greater than 90 degrees, mower 20 is less likely to tip. In one embodiment, feet 34 support plane 99 of mower 20 at an angle A of 100 degrees.

As shown by FIG. 4, wherein deck 24 of mower 20 is in the vertical position or vertical orientation, front wheels 28 are elevated above floor 82. As shown by FIG. 5, the vertical orientation of deck 24 and mower 20 provides mower 20 with a much smaller footprint 86'. As a result, mower 28 occupies much less space, such while being stored in one's garage or while in a facility awaiting repair or tuning. In addition, when in the vertical orientation shown in FIGS. 4 and 5, blade 26 is more easily accessible for cleaning, removal or replacement.

Braking system 38 comprises a system configured to brake or stop driven rotation of blade or blades 26 by engine 40 unless an actuator located distant to deck 24 and distant to blade 26 is being actuated or pressed against a bias, helping to prevent operation of mower 20 unless person's hands and feet are at a distance from blade 26. Braking system 38 is further configured to ensure that driven rotation of blade 26 is braked while handle 32 is collapsed or folded to the vertical storage position shown in FIGS. 3 and 4. FIGS. 10-14 illustrate an example of braking system 38. As shown by FIG. 10, braking system 38 comprises brake 102, brake release system 104 and brake release disabler 106.

Brake 102 comprises a braking mechanism actuatable between a braking position which driven rotation of the blade 26 is stopped and a release position in which blade 26 is drivable by engine 40. Brake 102 is biased towards the braking position. In one embodiment, brake 102 is in the release position by means of a clutch.

Brake release system 104 comprises a mechanism by which a person may manually apply force while at handle 32, away from blade 26, to release brake 102. In the example illustrated, brake release system 104 comprises motion transmission 108 and manual actuator 110. Motion transmission 108 transmits motion from manual actuator 110 to brake 102. In the example illustrated, motion transmission 108 comprises a wire 112 covered or guided by a sheath or cover 114, the wire 112 having a first end 116 connect to manual actuator 110 and a second end 118 connected to brake 102. The example illustrated, second end 118 is connected to a clutch of brake 102.

Manual actuator 110 comprises a handle or other member configured to be moved, wherein such a motion pulls upon the wire 112 to actuate brake 102 to the release position. In the example illustrated, manual actuator 110 comprises a bail arm pivotally supported by handle 32. Overall, brake 102, wire 112 and bail arm 116 form a brake release that is known as a "dead man control". In other embodiments, other forms of a brake release or dead man control may be utilized.

Brake release disabler 106 assists in ensuring that blade 26 cannot be driven while mower 20 is being moved to or is in the vertical storage orientation. Brake release disabler 106 disables brake release 104 while manual actuator 110 is in the actuated position, even when the bail arm of one actuator 110 is pressed against a bias to a closed position or actuated position while handle 32 is in the folded state shown in FIGS. 3 and 4 while being lifted to the vertical storage orientation or while in the vertical storage orientation. As a result, blades 26 cannot be driven while blades 26 are exposed as deck 24 is being pivoted or is in a vertical orientation.

Brake release disabler 106 comprises sheath or cover mounts 124, opening 126 and flexible cover 130. Sheet or cover mounts 124 comprise structures that secure or retain cover 114 in place against movement on opposite sides of opening 126. Cover mounts 124 may comprise a clip, fastener, bracket or other structure securing cover 114 against handle 32 or deck 24. Cover mounts 124 facilitate sliding movement of wire 112 within cover 114 along handle 32 and within any guide instruction provided by deck 124.

Opening 126 comprises a gap between cover mounts 124 and extending across the pivot axis 48 of handle 32. Opening 126 is configured such that wire 112 extending across opening 126 is permitted to bend and create slack across opening 126. As a result, when handle 32 is pivoted in the forward direction indicated by arrow 129 to the folded state as shown in FIGS. 13 and 14, a portion of wire 112 within opening 126 is allowed to bend, creating slack. Thus, even upon unintended depressment of manual actuator 110 (such as actuator 110 being pressed against a sidewall or against the deck 24), only the slack will be taken up and brake release 104 will remain disabled (with brake 102 remaining in the braking state).

Flexible cover 130 comprises a covering across opening 126 between mounts 124. Cover 108 is sufficiently flexible or non-rigid so as to not substantially impede bending or flexing of wire 112 to create slack during pivoting of handle 32 in the forward direction to the storage position. In one implementation, flexible cover 130 comprises a flexible bellows about wire 112, wherein cover 130 is spaced from wire 112 about wire 112 across opening 126. Flexible cover 130 protects wire 112 from debris and damage. In other implementations, flexible cover may have other configurations or may be omitted.

As shown by FIG. 11, when mower 20 is to be used, handle 32 is pivoted to an operational position. As a result, the points of cover mounts 124 align taking up the slack of wire 112 to place wire 112 in tension. As a result, actuation or depressment of manual actuator 110 while handle 32 is in the operational position results in motion being transferred to the clutch or other structure brake 102 to disable brake 102 for the driving of blade 26.

In other implementations, brake release disabler 106 may have other configurations or may be omitted. For example, in other embodiments, other devices may be utilized to disable brake release or ensure actuation of brake 102 in response to handle 32 being folded against deck 24 or in response to deck 24 or other portions of mower 20 being in the vertical storage orientation shown in FIG. 4. Examples of such other alternative devices include, but are not limited to, a mercury or ball tilt switch for grounding the engine at tilt angles exceeding a maximum operational angle (30 degrees head up) or a ground wire to a mower handle bracket that will groundout the engine when handle 32 is pivoted into the forward configuration shown in FIG. 3.

Referring back to FIGS. 1, 3, and 4, engine 40 comprises a gas powered internal combustion engine operably coupled the blade 26 by transmission (not shown) to drive blade 26. In some embodiments, engine 40 additionally drives or propels mower 20 such as with a self-propelled mower. Engine 40 comprises several chambers which contain engine fluids such as gas (also known as fuel) and oil. To facilitate prolonged storage of motor 20 in the vertical orientation shown in FIG. 4, engine 40 specifically configured such that when deck 24 is in the vertical orientation shown in FIG. 4, such engine fluids to not leak and do not come into contact with caps where such leaking might occur. Examples of chambers or compartments in engine 40 that contain engine fluids include its fuel tank, carburetor, and oil sump.

Figure 15:
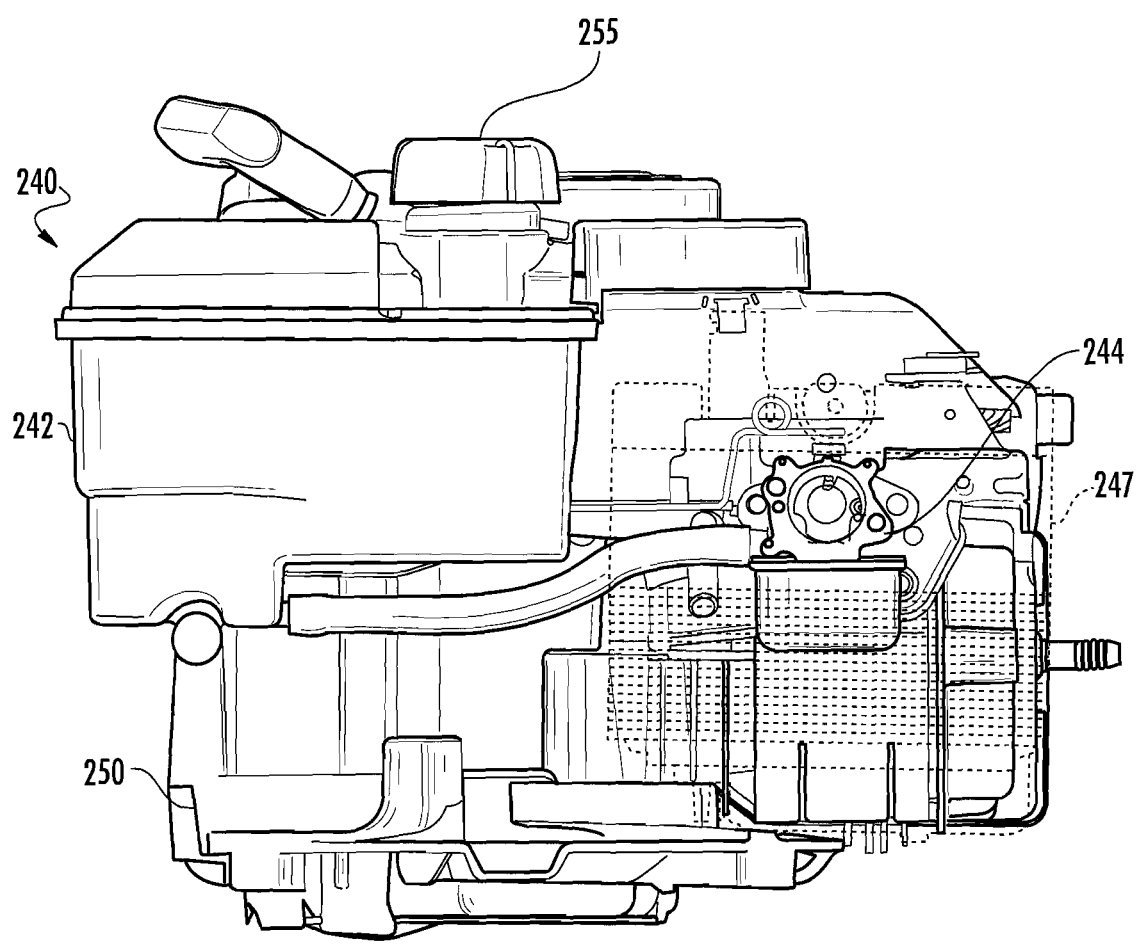
FIG. 15 is a side elevational view of an example engine of the mower of FIG. 1 when the mower is in the operating orientation shown in FIG. 1.
Figure 16:
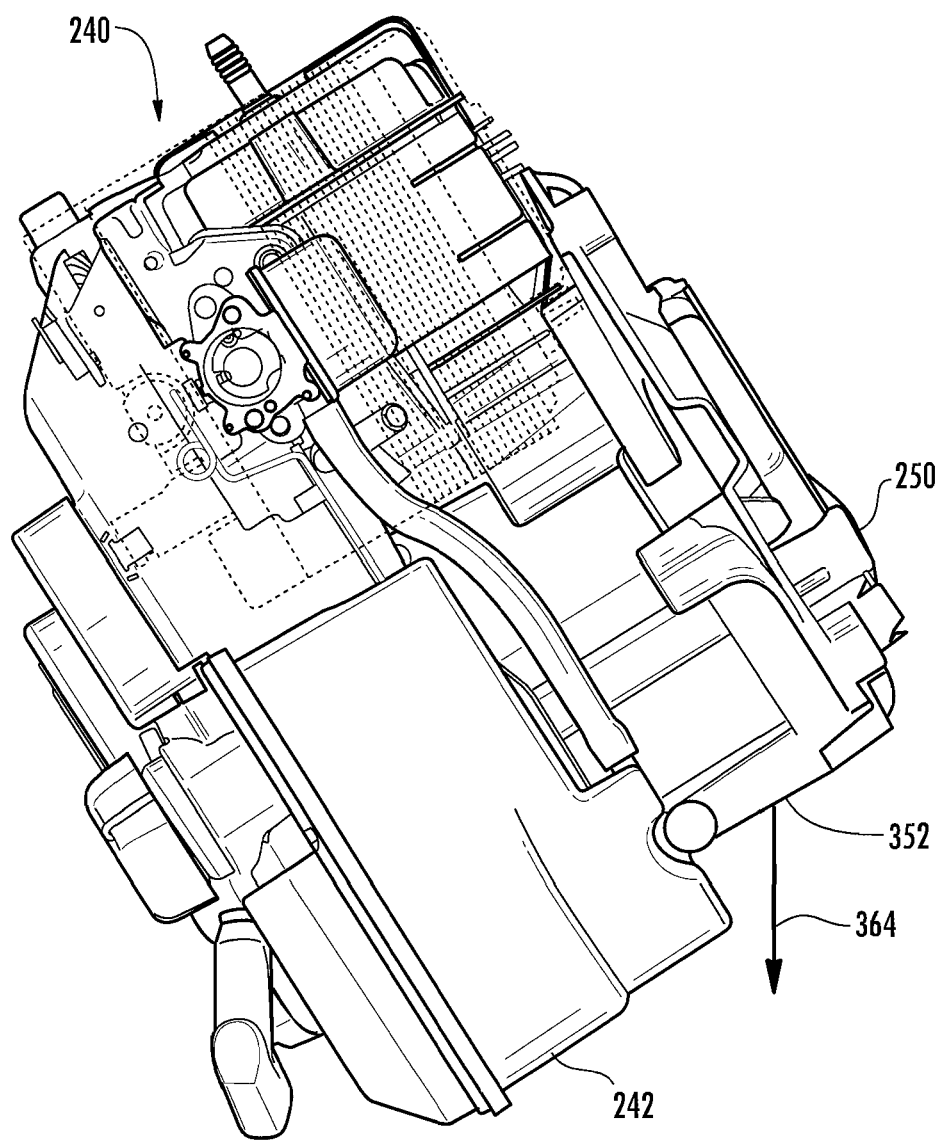
FIG. 16 is a side elevational view of the engine of FIG. 15 when the mower is in the vertical storage orientation shown in FIG. 4.

FIG. 15 illustrates one example engine 240 that may be utilized as engine 40 in mower 20. Engine 240 comprises a gas powered four cycle internal combustion engine. Engine 240 comprises fuel tank 242, carburetor 244 (shown in FIG. 15 behind the illustrated air filter 247) and oil sump 250. As noted above, each of such engine fluid containing components, fuel tank 242, carburetor 244 and oil sump 250, are configured such that when deck 24 is in the vertical orientation shown in FIG. 4, such engine fluids to not leak and do not come into contact with caps where such leaking might occur. FIG. 16 illustrates an example orientation of engine 240 when mower 20 and is deck 24 are in the vertical orientation shown in FIG. 4 (nominally having an angle A of 110 degrees).

Figure 17:
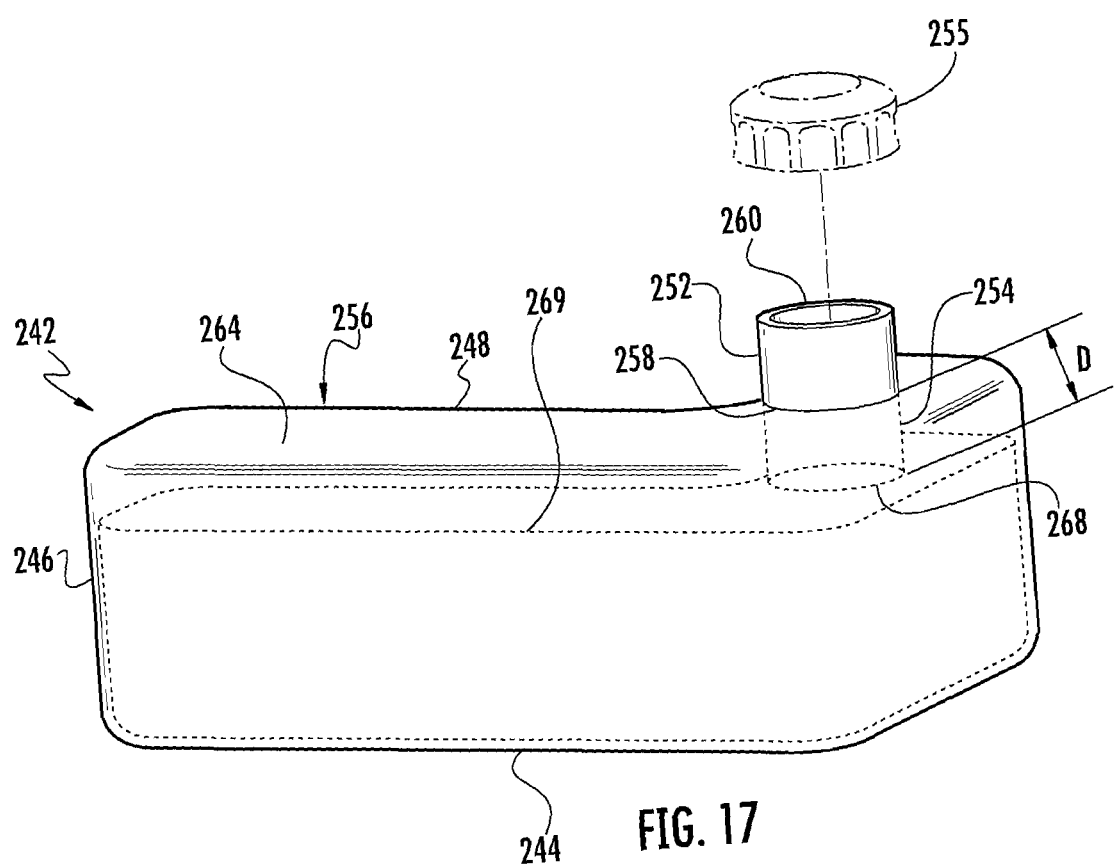
FIG. 17 is a perspective view of an example fuel tank of the engine of FIG. 15 when the mower is in the operating orientation shown in FIG. 1.

FIG. 17 illustrates fuel tank 242 in more detail. Fuel tank 242 stores fuel prior to the fuel (gasoline) being drawn through an outlet port in fuel tank 242 into carburetor 244. As shown by FIG. 17, fuel tank 242 (shown as partially transparent for purposes of illustration) comprises floor 244, sidewalls 246, top 248, filler neck 252, filler skirt 254 and vented cap 255. Floor 244, sidewalls 246 and top 248 each comprise one or more walls that define or form a container 256 having an internal volume and an opening 258 which forms a port through the wall forming top 256. Although the formed container 256 is illustrated as having a general L-shape, in other embodiments, container 256 may have other shapes, proportions and sizes.

Filler neck 252 comprises a tubular structure extending about opening 258 and projecting away from container 256 on an exterior of container 256. Filler neck 252 has a top opening 260 and may be configured to removably receive the vented cap 255 including external threads or other securement means. Filler neck 252 directs received gas into the interior of container 256 through opening 258.

Figure 18:
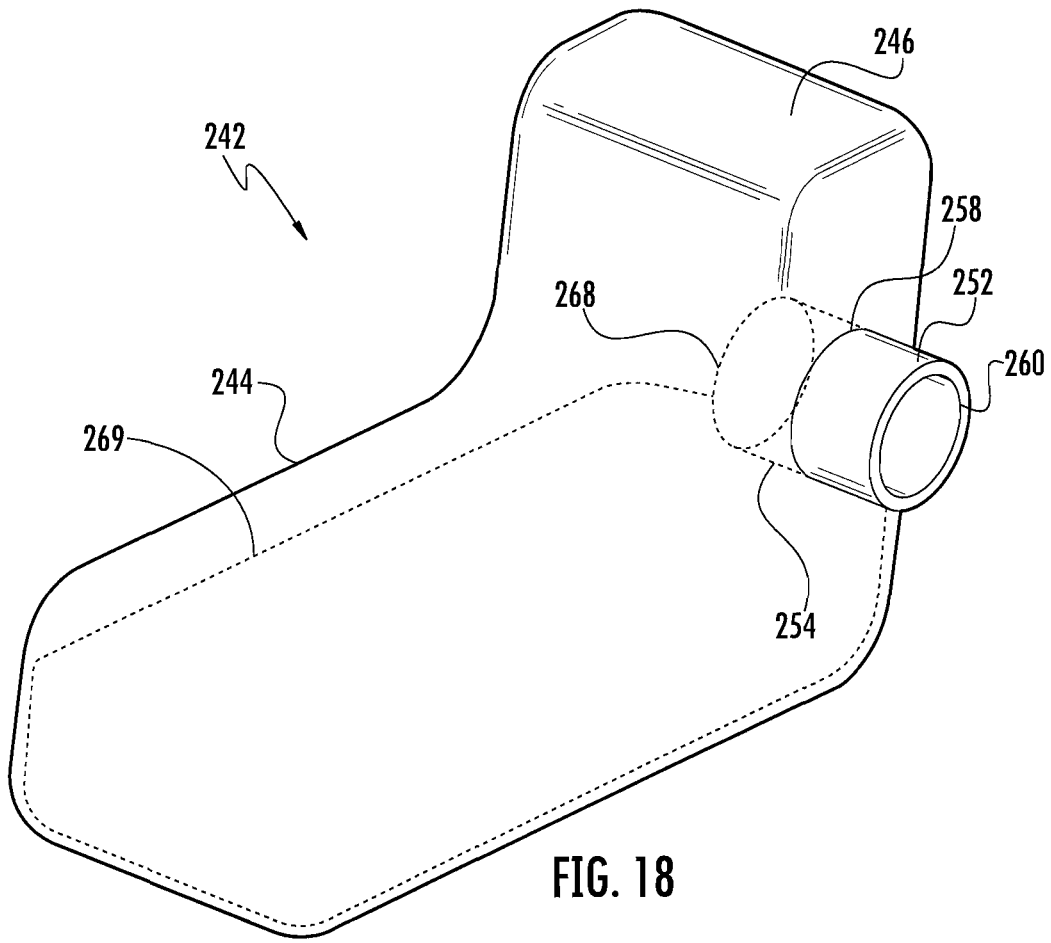
FIG. 18 is a first perspective view of the fuel tank of FIG. 17 when the mower is in the vertical storage orientation shown in FIG. 4.
Figure 19:
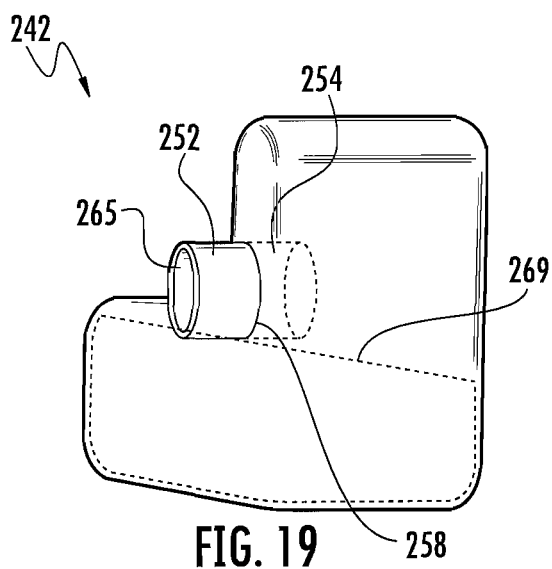
FIG. 19 is a second perspective view of the fuel tank of FIG. 17 when the mower is in the vertical storage orientation shown in FIG. 4.
Figure 20:
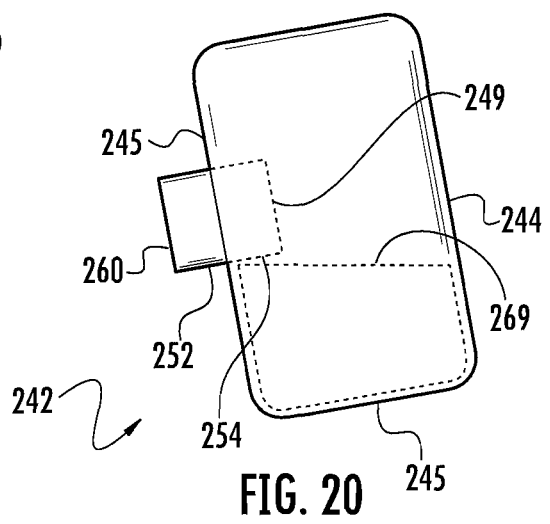
FIG. 20 is a side elevational view of the fuel tank of FIG. 17 when the mower is in the vertical storage orientation shown in FIG. 4.

Filler skirt 254 comprises a tubular structure extending about opening 258 and projecting into the interior container 256 within container 256. The lower end 268 of filler skirt 254 defines the highest point or level 269 at which fuel may be filled into a container 256. Filler skirt 254 projects below the interior surface of top 248 by a distance D so as to create a vapor lock volume 264. Vapor lock volume 264 is defined by the volume above the lower end 268 of filler skirt 254 to the upper surfaces of top 248 when mower 20 and deck 24 are substantially level or horizontal. Vapor lock volume 264 is a volume no less than an internal volume of tank above a bottom of skirt 268 when mower 20 and deck 24 are in the vertical storage orientation. As a result, even when fuel tank 242 is rotated or pivoted with the pivoting of mower 20 and deck 24 from the operational orientation to the vertical storage orientation, fuel does not reach opening 258, let alone opening 260. FIGS. 18-20 provide different views of fuel tank 242, filled to maximum extent when in the horizontal operational position, after mower 20 and deck 24 have been pivoted to the vertical storage orientation shown in FIGS. 3, 4 and 16. Thus, the containment of fuel does not flow through the vent of cap 255. In some embodiments, the distance D by which skirt 254 projects into a container 256 towards floor 244 may be shortened by increasing the height of filler neck 252. Although the example implementation is illustrated as including filler neck 252, in some other implementations, filler neck 252 may be omitted.

Figure 21:
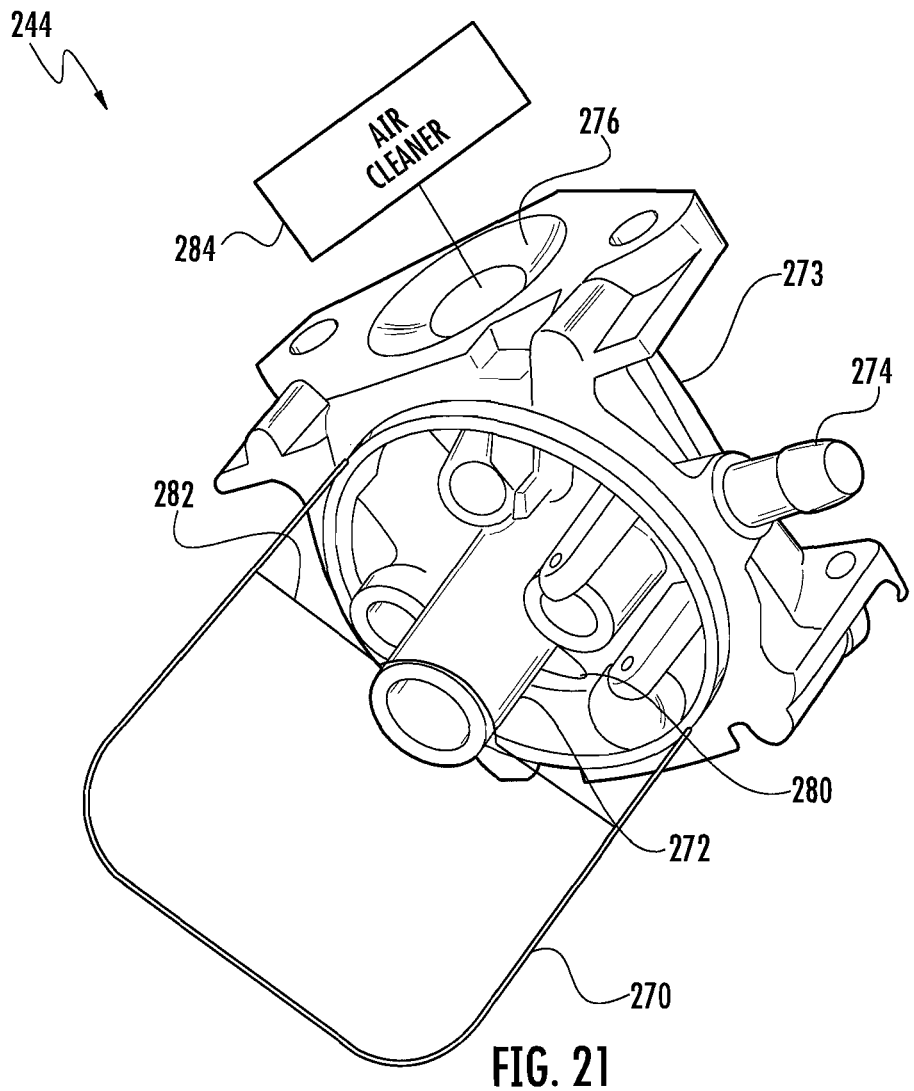
FIG. 21 is a perspective view of an example carburetor of the engine of FIG. 15.
Figure 22:
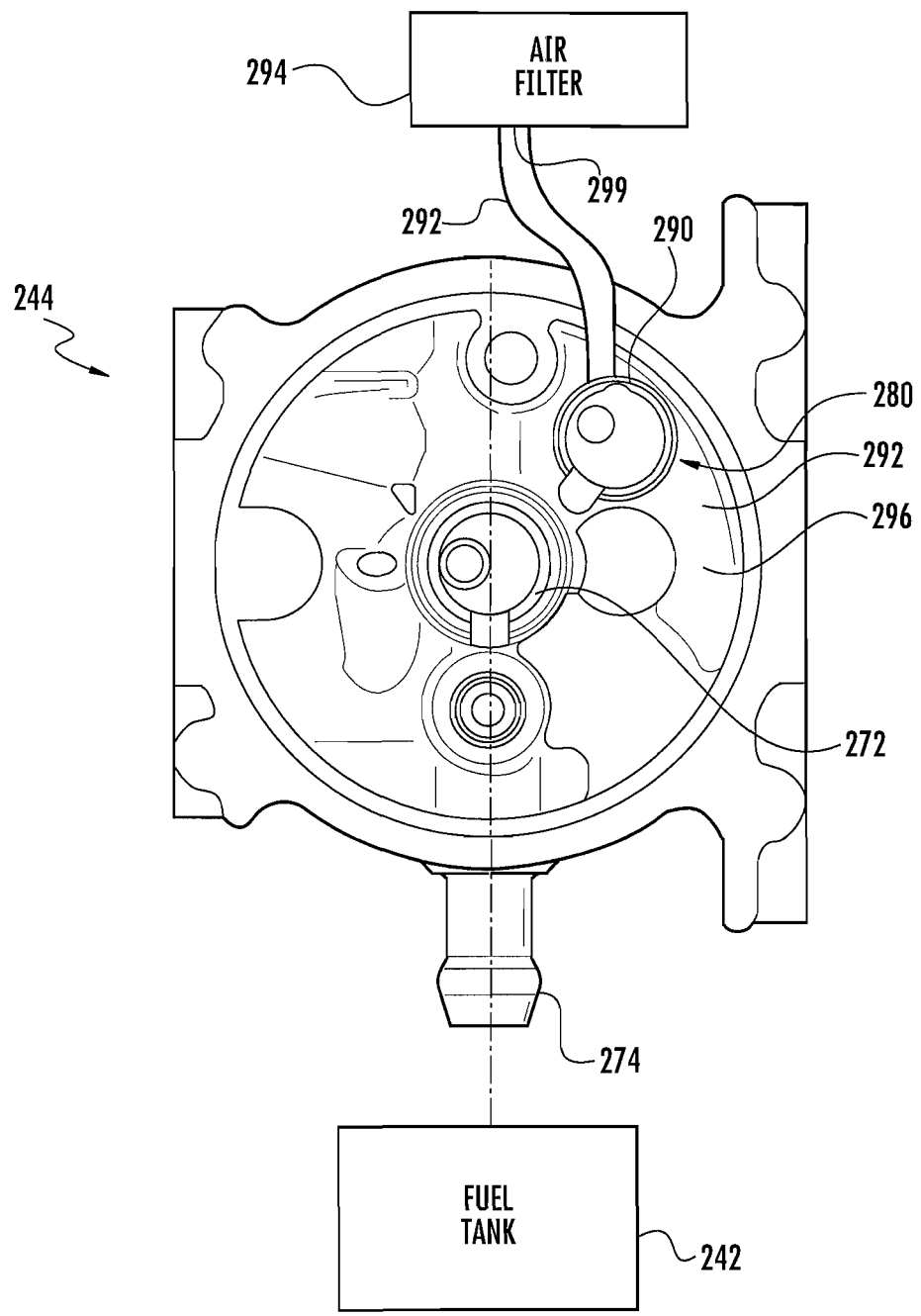
FIG. 22 is a side elevational view of the carburetor of FIG. 21 when the mower is in the vertical storage orientation shown in FIG. 4.

FIGS. 21 and 22 illustrate carburetor 244 in more detail. Carburetor 244 comprises an engine component that provides an air-fuel mixture to a combustion chamber based upon operating speed and load. In the implementation illustrated, carburetor 244 and, in particular, the fuel inlet of carburetor 244 is located above fuel tank 242 and above fuel head pressure when mower 20 has been pivoted to the vertical storage orientation shown in FIG. 4. Carburetor 244 comprises bowl 270 (schematically shown), emulsion tube 272, fuel intake 274, air intake 276, venturi 278, an intake port outlet (not shown) and bowl vent 280. Bowl 270 contains a liquid fuel. Emulsion tube comprises a cylindrical component submerged within or below the fuel level 282 within bowl 270. Fuel intake 274 comprises a tubular connector for being connected to a tube that is connected to fuel tank 242. Air intake 276 comprise a port in communication with venturi 278 to provide air at atmospheric pressure to venturi 278. In the example illustrated, air intake 276 is connected to an air cleaner 284 (schematically shown). Venturi 278 comprises a body forming a narrow portion of passage wherein air and fuel vapor are mixed and provided to engine 240 through the intake port outlet.

Bowl vent 280 comprises a passage formed in carburetor 244 connecting interior of bowl 270 to atmosphere.

During operation, a generally predefined level of liquid gasoline or fuel is maintained within bowl 270. This predefined level of fuel within bowl 270 remains between uses of mower 20. FIG. 22 illustrates carburetor 244 when engine 240 is tilted as a result of mower 20 and deck 24 being pivoted to the vertical orientation shown in FIG. 4. FIG. 22 further illustrates a typical level of gasoline within carburetor 244 between uses of mower 20. As shown by FIG. 22, bowl vent 280 comprises vent opening 290, vent conduit 292 and air filter 294. Vent opening 290 comprises an opening in the wall located to extend above a level 296 of fuel or gas within bowl 270 when deck 24 is in the vertical storage orientation shown in FIG. 4. As a result, when mower 20 is in the vertical storage orientation shown in FIG. 4, the liquid fuel or gasoline does not drain or leak through vent opening 280.

Vent conduit 292 comprises a tube or other passageway extending from vent opening 280 and terminating at a vent outlet 299 adjacent to air filter 294. Vent outlet 299 is also located above the level 296 of fuel within carburetor 244. In some implementations in which vent outlet 299 is above the level 296 of fuel in carburetor 244 when mower 20 is in the vertical storage orientation, vent opening 290 may alternatively be located below level 296. In other implementations, vent conduit 292 may be omitted, wherein vent outlet 299 is provided by vent opening 290. Because vent outlet 299 is located above level 296, engine 240 is better suited for prolonged storage while being vertically oriented as shown in FIG. 4 with reduced or no leakage of fuel.

Figure 23:
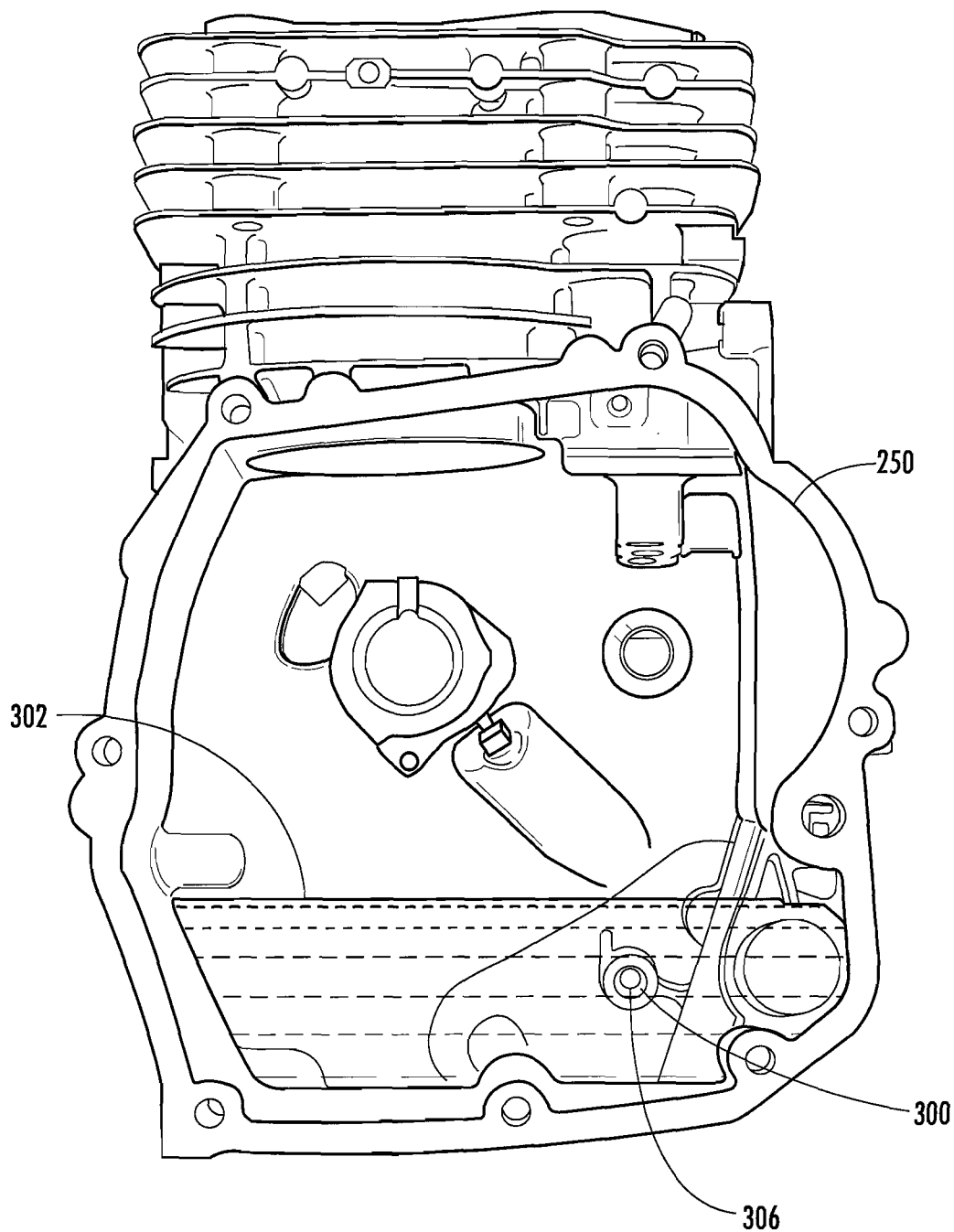
FIG. 23 is a side elevational view of an example oil sump of the engine of FIG. 15 when the mower is in the vertical storage orientation shown in FIG. 4.
Figure 24:
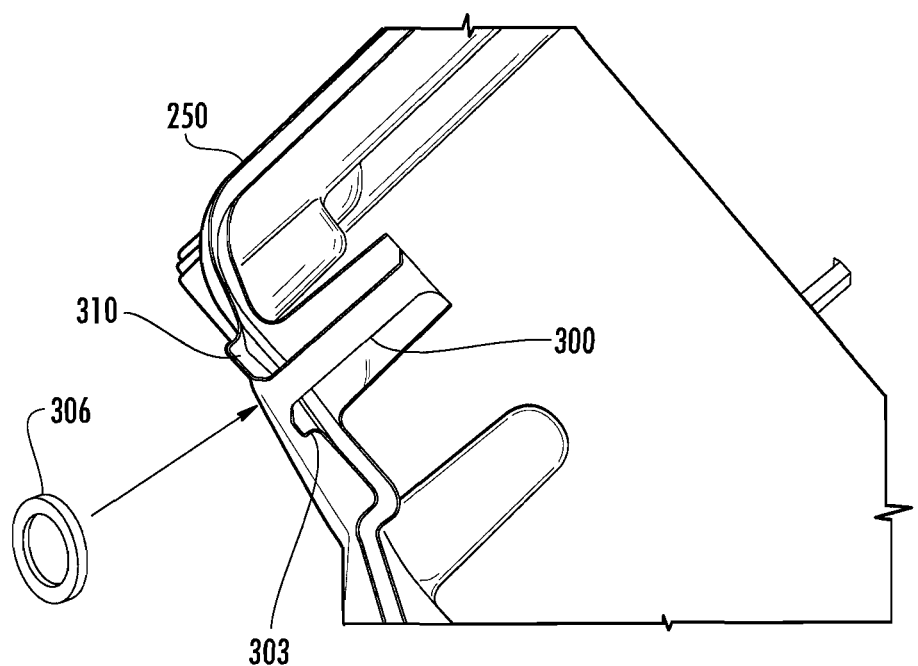
FIG. 24 is an exploded fragmentary sectional view of the oil sump of FIG. 23.
Figure 25:
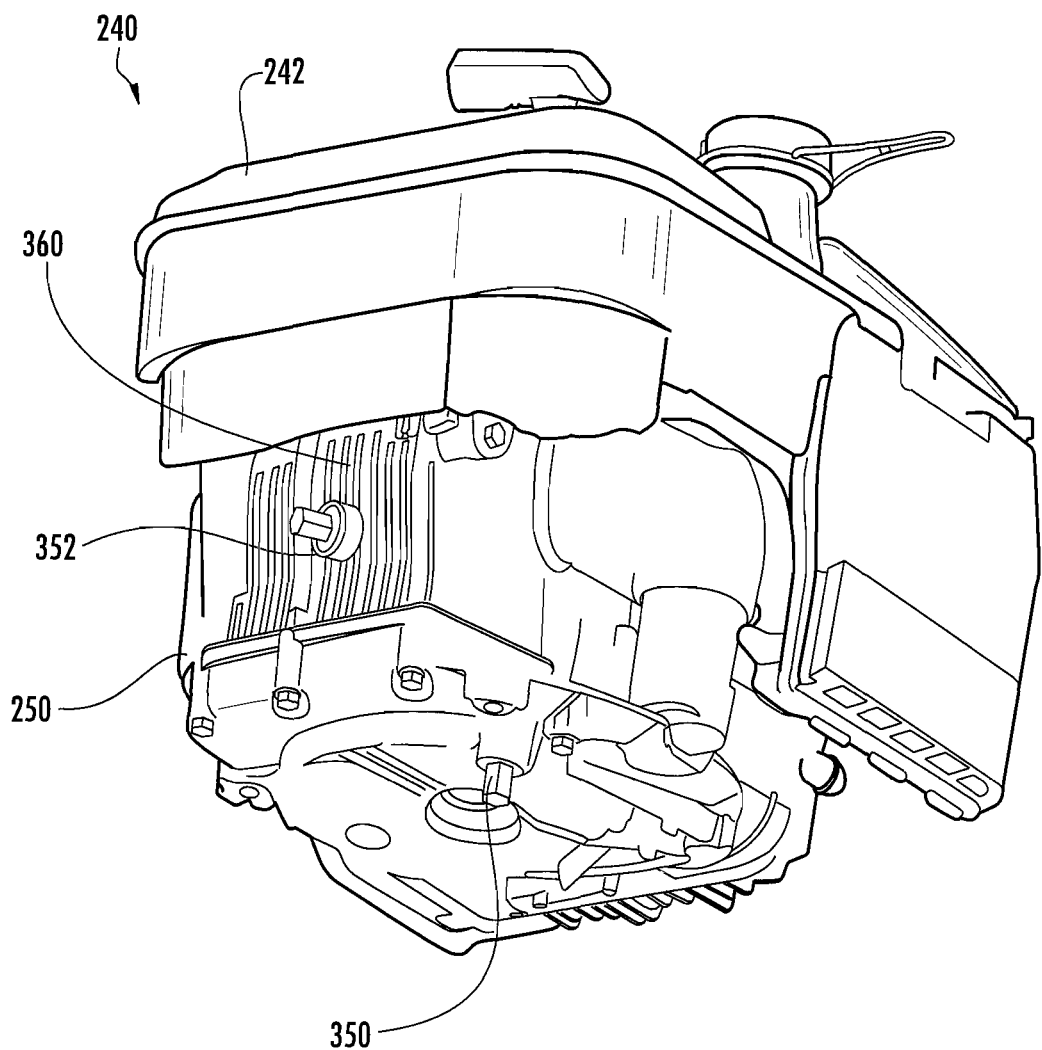
FIG. 25 is a perspective view of the engine of FIG. 15 illustrating example oil drain ports.

FIGS. 23-25 illustrate oil sump 250 in more detail. As shown by FIG. 23, oil sump 250 comprises a basin or other receptacle for containing oil used to lubricate engine 240. Oil sump 250 generally contains a predefined minimum amount of oil sufficient to provide adequate lubrication of engine 240. Oil sump 250 further includes a mechanical governor and governor shaft passage 300 through which the shaft of a governor (not shown) of engine 240 extends. The governor shaft is coupled to a mechanical governor provided in the sump which is coupled via gearing to the crankshaft, acts as a speed sensing device, whereby the governor maintain the desired engine speed the regardless of load applied to engine 240.

FIG. 23 illustrates oil sump 250 when engine 240 has been tilted as a result of mower 20 and deck 24 being pivoted to the vertical storage orientation shown in FIG. 4. As shown by FIG. 23, when oil sump 250 is tilted or pivoted to the vertical storage orientation, the predefined minimum amount of oil within oil sump 250 has a level 302 which extends above governor shaft passage 300. As shown by FIG. 24, oil sump 250 additionally includes a seal 306 fit within a corresponding recess 308 formed in wall 310 of some 250 about governor shaft passage 300. Seal 306 inhibits the leakage of oil through passage 300 along the governor shaft. In one embodiment, seal 306 comprises a rubber-like ring. In other implementations, seal 306 may have other configurations.

As shown by FIG. 25, oil sump 250 additionally comprises a pair of oil drain ports 350, 352. Oil drain ports 350, 352 comprise openings through walls of oil sump 250 facilitate the draining of oil from oil sump 250 when the engine oil is being changed. When oil is not being drained, oil drain ports 350, 352 are closed by plugs or other closing members.

Oil drain port 350 facilitates the draining of oil from oil sump 250 when engine 240 is upright, when mower 20 is in an operational orientation as shown in FIG. 1 or 3. In some implementations, access to oil drain port 350 may be difficult due to surrounding components of engine 240 and deck 24. In some implementations, oil drain port 350 may be omitted, wherein oil is removed from sump 250 through an oil fill port which generally faces in an upward direction when mower 20 is in the operational orientation shown in FIG. 1.

Oil drain port 352 facilitates the draining of oil from oil sump 250 when engine 240 is pivoted or tilted as a result of mower 20 being pivoted to the vertical storage orientation shown in FIG. 4. As shown in FIG. 25, oil drain port 352 extends through a rear wall 360 of oil sump 250 (a wall facing rearwardly towards handle 32) when mower 20 is in the operational position shown in FIG. 1. However, upon mower 20 being pivoted to the vertical storage orientation, oil drain port 352 extends through what is now the bottom or lower most wall of oil sump 250. As a result, as shown by FIG. 16, oil may be drained from sump 250 in the direction indicated by arrow 364 while mower 20 is stored. Such oil drainage may be achieved without mower 20 having to be manually maintained in a tilted orientation to ensure complete oil drainage. Moreover, because the rear of engine 240 is largely open and not blocked by other structures (such as those structure that might exist along the bottom of engine 240 during operation), access to oil drain port 352 is enhanced for the easier changing of oil.

Figure 26:
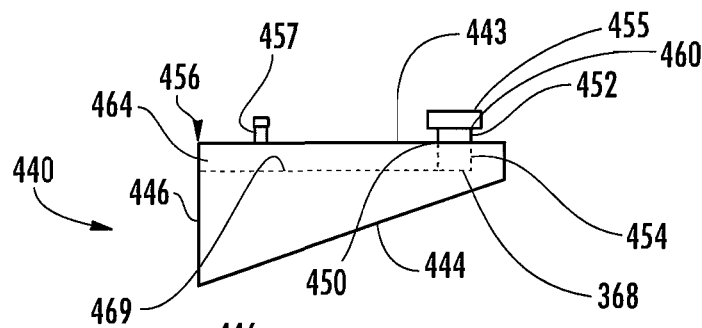
FIG. 26 is a side elevational view of another example implementation of the fuel tank of FIG. 17 in a substantially horizontal operational orientation.
Figure 27:
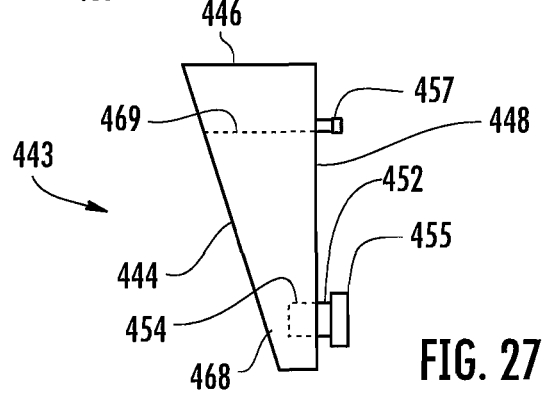
FIG. 27 is a side elevational view of the fuel tank of FIG. 26 in a substantially vertical storage orientation.

As noted above, engine 240 is configured to operate in both a substantially horizontal operating orientation and a vertically inclined or tilted storage orientation without leaking engine fluids. In other implementations, engine 240 may have other configurations. For example, engine 240 may have other configurations for its fuel tank, carburetor or oil sump. FIGS. 26-29 illustrate alternative implementations for fuel tank 240. FIGS. 26 and 27 illustrate fuel tank 440. FIG. 26 illustrates fuel tank 440 in a substantially horizontal operational orientation such as when the mower is in the orientation shown in FIG. 1. FIG. 27 illustrates fuel tank 440 in a substantially vertical storage orientation, such as when the mower is in the orientation shown FIG. 4. As shown by FIG. 26, tilting 440 (shown as partially transparent for purposes of illustration) comprises floor 444, sidewalls 446, top 448, filler neck 452, filler skirt 454, sealed cap 455 and vent 457. Floor 444, sidewalls 446 and top 448 each comprise one or more walls that define or form a container 456 having an internal volume and an opening 458 which forms a port through the wall forming top 456. Although the formed container 456 is illustrated as having a triangular shape, in other embodiments, container 456 may have other shapes, proportions and sizes.

Filler neck 452 comprises a tubular structure extending about opening 458 and projecting away from container 456 on an exterior of container 456. Filler neck 452 has a top opening 460 and may be configured to removably receive sealing cap 455 including external threads or other securement means. Filler neck 452 directs received gas into the interior of container 456 through opening 458.

Filler skirt 454 comprises a tubular structure extending about opening 458 and projecting into the interior container 456 within container 456. The lower end 468 of filler skirt 454 defines the highest point or level 469 at which fuel may be filled into a container 456. Filler skirt 454 projects below the interior surface of top 448 by a distance so as to create a vapor lock volume 464. Vapor lock volume 464 is defined by the volume above the lower end 468 of filler skirt 454 to the upper surfaces of top 448 when mower 20 and deck 24 are substantially level or horizontal. Vapor lock volume 464 is a volume no less than an internal volume of tank above a bottom of vent 457 when mower 20 and deck 24 are in the vertical storage orientation. As a result, even when fuel tank 442 is rotated or pivoted with the pivoting of mower 20 and deck 24 from the operational orientation to the vertical storage orientation, fuel does not reach the opening of 457 as shown FIG. 27. Although the example implementation is illustrated as including filler neck 452, in some other implementations, filler neck 452 may be omitted.

Figure 28:
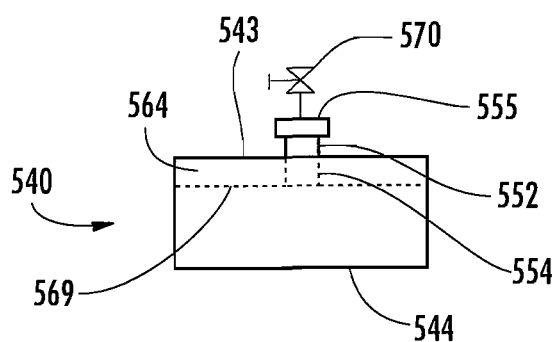
FIG. 28 is a side elevational view of another example implementation of the fuel tank of FIG. 17 in a substantially horizontal operational orientation.
Figure 29:
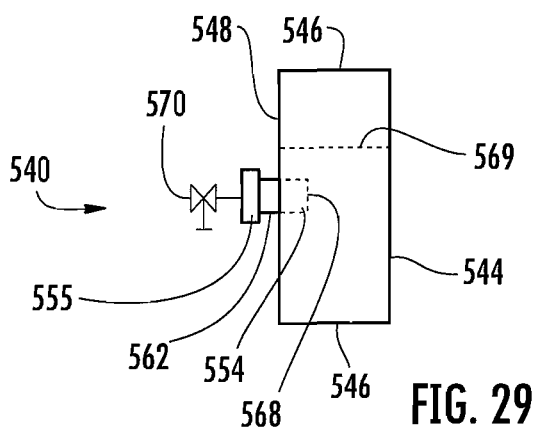
FIG. 29 is a side elevational view of the fuel tank of FIG. 28 in a substantially vertical storage orientation.

FIGS. 28 and 29 illustrate fuel tank 540. FIG. 27 illustrates fuel tank 540 in a substantially horizontal operational orientation such as when the mower is in the orientation shown in FIG. 1. FIG. 29 illustrates fuel tank 540 in a substantially vertical storage orientation, such as when the mower is in the orientation shown FIG. 4. As shown by FIG. 28, fuel tank 540 (shown as partially transparent for purposes of illustration) comprises floor 544, sidewalls 546, top 548, filler neck 552, filler skirt 554 and cap 555. Floor 544, sidewalls 546 and top 548 each comprise one or more walls that define or form a container 556 having an internal volume and an opening 558 which forms a port through the wall forming top 556. Although the formed container 556 is illustrated as having a rectangular shape, in other embodiments, container 556 may have other shapes, proportions and sizes.

Filler neck 552 comprises a tubular structure extending about opening 558 and projecting away from container 556 on an exterior of container 556. Filler neck 552 has a top opening 560 and may be configured to removably receive cap 555 including external threads or other securement means. Filler neck 552 directs received gas into the interior of container 556 through opening 558.

Filler skirt 554 comprises a tubular structure extending about opening 558 and projecting into the interior container 556 within container 556. The lower end 568 of filler skirt 554 defines the highest point or level 569 at which fuel may be filled into a container 556. Filler skirt 554 projects below the interior surface of top 548 by a distance so as to create a vapor lock volume 564. Vapor lock volume 564 is defined by the volume above the lower end 568 of filler skirt 554 to the upper surfaces of top 548 when mower 20 and deck 24 are substantially level or horizontal.

As schematically shown by FIGS. 28 and 29, cap 555 includes a vent that is in communication with outside atmosphere through a valve 570. Valve 570 comprises a "rollover" valve or a "liquid check" valve that is configured to allow the escape of gases from vapor lock 464 when fuel tank 540 is in the operational horizontal position shown in FIG. 28. At the same time, valve 570 is configured to inhibit the flow or the escape of liquid, gasoline, through valve 570 when fuel tank 540 is in the vertical storage orientation shown in FIG. 29, such as when mower 20 is in the vertical storage orientation shown in FIG. 4. As a result, cap 555 allows venting of tank 540 to atmosphere, while at the same time, allowing vertical storage of tank 540 without or with minimal fuel leakage. In one implementation, the opening and closing of valve 570 is automatic (such as with a "rollover" or "liquid check valve"), being actuated based upon the presence of liquid or fuel or in response to the forces of gravity due to the orientation of fuel tank 540.

In another implementation, the opening and closing of valve 570 may be manual, such as with a manually actuated ball valve or a needle valve. In examples where valve 570 is alternatively manually actuated, a person would actuate the valve to a closed position prior to orienting the mower in the vertical orientation storage position shown in FIG. 4. In some implementations, gases vented through valve 570 may alternatively be transmitted to a vapor collection system. Although the example implementation is illustrated as including filler neck 452, in some other implementations, filler neck 452 may be omitted.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. An apparatus comprising:
   a gas powered walk behind mower comprising:
   a deck;
   a gas powered engine supported by the deck; and
   a rotating cutting blade driven by the gas powered engine, wherein the deck is configured to be stored in a generally vertical orientation without leaking of fluid contained in the gasoline powered engine, wherein the deck carries a plurality of wheels and wherein at least one of the wheels is elevated off ground when the deck is in the vertical orientation and wherein a handle extends substantially parallel to the deck when the deck is in the vertical orientation;
   a mechanical latch actuatable between a locked state in which the latch locks the handle in a collapsed position along the deck and an unlocked state in which the handle is pivotable to an extended use position; and
   an actuator to actuate the latch between the locked state and the unlocked state,
   wherein the gas powered engine comprises:
   a fuel tank having a vent to permit escape of vapor from the fuel tank when the mower is in a substantially horizontal operating orientation and wherein the fuel tank is configured to prevent gasoline from passing through the vent when the fuel tank is maximally filled with gasoline when in the substantially horizontal operating orientation and while the deck is in the vertical orientation,
   wherein the fuel tank comprises:
   a cap having a vent opening providing the vent; and
   a filler skirt projecting into an interior of the tank by a distance to form a vapor lock volume when the mower is in a substantially horizontal operating orientation and wherein the vapor lock volume is no less than an internal volume of the tank above a lower end of the skirt when the deck is in the vertical orientation.

2. The apparatus of claim 1, wherein the fuel tank comprises a fill port, wherein the fuel tank is configured to contain a maximum amount of fuel when the deck is in a horizontal operating orientation and wherein the tank is configured such that fuel within the fuel tank cannot reach the fill port when the deck is in the vertical orientation while the fuel tank contains the maximum amount of fuel.

3. The apparatus of claim 2, wherein the deck extends in a plane angularly spaced from horizontal by at least 60 degrees when in the generally vertical orientation.

4. The apparatus of claim 2, wherein the engine comprises:
   an oil sump, the sump comprising a passage through which a governor shaft extends, wherein the governor shaft passage is located below oil within the sump when the mower is stored with the deck in the vertical orientation; and
   a seal about the governor shaft passage inhibiting oil leakage from the sump through the passage.

5. The apparatus of claim 4 further comprising a first oil drain port extending in a first direction through a first wall of the sump, wherein the first wall forms a bottom of the sump when the deck is in the vertical orientation.

6. The apparatus of claim 5 further comprising a second oil drain port through a second wall of the sump, wherein the second wall forms the bottom of the sump when the deck is in the horizontal operating orientation.

7. The apparatus of claim 2, wherein the engine comprises:
   an oil sump comprising:
   a first wall; and
   a first oil drain port extending in a first direction through the first wall when the first wall forms a bottom of the sump when the deck is in the vertical orientation.

8. The apparatus of claim 7, wherein the oil sump further comprises:
   a second wall; and
   a second oil drain port through the second wall, wherein the second wall forms the bottom of the sump when the deck is in the horizontal operating orientation.

9. The apparatus of claim 2, wherein the engine comprises:

a carburetor bowl configured to store a volume of gasoline; and a bowl vent having a vent outlet located to extend above a level of the volume of gas when the deck is in the vertical orientation.

10. The apparatus of claim 9, wherein the carburetor bowl has a wall and wherein the then outlet includes an opening formed in the wall at a location above the level of the volume of gas when the deck is in the vertical orientation.

11. The apparatus of claim 9 further comprising a conduit extending from the carburetor bowl, the conduit having a terminal end forming the vent outlet.

12. The apparatus of claim 1, wherein the engine comprises:

an oil sump, the sump comprising a passage through which a governor shaft extends, wherein the governor shaft passage is located below oil within the sump when the mower is stored with the deck in the vertical orientation; and a seal about the governor shaft passage inhibiting oil leakage from the sump through the passage.

13. The apparatus of claim 12 further comprising an oil drain port extending in a first direction through a first wall the sump of the first wall forms a bottom of the sump when the deck is in the vertical orientation.

14. The apparatus of claim 1, wherein the engine comprises:

a carburetor bowl configured to store a volume of gas between uses of the mower; and a bowl vent having a vent opening located to extend above a level of the volume of gas when the deck is in the vertical orientation.

15. The apparatus of claim 1, wherein the deck extends in a plane angularly spaced from horizontal by at least 60 degrees when in the generally vertical orientation.

16. The apparatus of claim 15 further comprising a bracket carried by the deck, the bracket comprising:

a storage detent;

a projection carried by the handle, the projection movable between an extended position and a retracted position, the projection being resiliently biased towards the extended position; and an actuator for moving the projection towards the retracted position, wherein the projection extends into the storage detent in the extended position when the deck is in the vertical orientation.

17. The apparatus of claim 16 further comprising a foot to prop the deck in the vertical orientation.

18. The apparatus of claim 17, wherein the foot is integrally formed as a single unitary body with the bracket.

19. The apparatus of claim 1 further comprising a blade disabler configured to disable driven rotation of the blade based upon an orientation of the deck.

20. The apparatus of claim 19, wherein the blade disabler is selected from a group of blade disabling mechanisms consisting of: an electrical ground, a mercury switch, and an opening in a Bowden cable.

21. The apparatus of claim 1, wherein the apparatus further comprises:

a brake actuatable between a braking position in which driven rotation of the blade is stopped and a released position in which the blade is drivable by the engine, the brake being biased towards the braking position; and a brake release comprising:

manual actuator carried by the handle and movable against a bias to an actuated position;

a wire extending from the manual actuator to the brake to move the brake towards the released position in response to the manual actuator being moved to the actuated position; and a mechanism configured to disable the brake release while the manual actuator is in the actuated position and based on an orientation of the deck.

22. The apparatus of claim 1, wherein the handle is pivotable about an axis relative to the deck and wherein the mower further comprises:

a brake actuatable between a braking position in which driven rotation of the blade is stopped and a released position in which the blade is drivable by the engine, the brake being biased towards the braking position;

manual actuator carried by the handle and movable against a bias to an actuated position;

a wire extending from the manual actuator to the brake to move the brake towards the released position in response to the manual actuator being moved to the actuated position; and a wire cover about the wire, the wire cover having an opening spanning the axis such that folding of the handle towards the deck creates wire slack within the opening to disable the brake release while the manual actuator is in actuated position when the handle extends substantially parallel to the deck.

23. The apparatus of claim 22 further comprising a second cover spaced from the wire about the wire across the opening, the second cover being sufficiently flexible to facilitate bending of the wire within the second cover and relative to the second housing.

24. The apparatus of claim 1, wherein the actuator comprises a manually actuatable mechanism having a cable coupled to the mechanical latch.

25. An apparatus comprising:

a gas powered walk behind mower comprising:

a deck;

a gas powered engine supported by the deck; and a rotating cutting blade driven by the gas powered engine, wherein the deck is configured to be stored in a generally vertical orientation without leaking of fluid contained in the gasoline powered engine, wherein the deck carries a plurality of wheels and wherein at least one of the wheels is elevated off ground when the deck is in the vertical orientation and wherein a handle extends substantially parallel to the deck when the deck is in the vertical orientation;

a mechanical latch actuatable between a locked state in which the latch locks the handle in a collapsed position along the deck and an unlocked state in which the handle is pivotable to an extended use position; and an actuator to actuate the latch between the locked state and the unlocked state, wherein the gas powered engine comprises:

a fuel tank having a vent to permit escape of vapor from the fuel tank when the mower is in a substantially horizontal operating orientation and wherein the fuel tank is configured to prevent gasoline from passing through the vent when the fuel tank is maximally filled with gasoline when in the substantially horizontal operating orientation and while the deck is in the vertical orientation, wherein the fuel tank comprises:

a sealing cap;

a vent opening extending through a wall of the fuel tank to provide the vent, the opening being spaced from the sealing cap; and a filler skirt projecting into an interior of the tank by a distance to form a vapor lock volume when the mower is in a substantially horizontal operating orientation and wherein the vapor lock volume is no less than an internal volume of the tank above a lower end of the vent opening when the deck is in the vertical orientation.

26. An apparatus comprising:

a gas powered walk behind mower comprising:

a deck;

a gas powered engine supported by the deck; and a rotating cutting blade driven by the gas powered engine, wherein the deck is configured to be stored in a generally vertical orientation without leaking of fluid contained in the gasoline powered engine, wherein the deck carries a plurality of wheels and wherein at least one of the wheels is elevated off ground when the deck is in the vertical orientation and wherein a handle extends substantially parallel to the deck when the deck is in the vertical orientation;

a mechanical latch actuatable between a locked state in which the latch locks the handle in a collapsed position along the deck and an unlocked state in which the handle is pivotable to an extended use position; and an actuator to actuate the latch between the locked state and the unlocked state, wherein the gas powered engine comprises:

a fuel tank having a vent to permit escape of vapor from the fuel tank when the mower is in a substantially horizontal operating orientation and wherein the fuel tank is configured to prevent gasoline from passing through the vent when the fuel tank is maximally filled with gasoline when in the substantially horizontal operating orientation and while the deck is in the vertical orientation, wherein the fuel tank comprises a cap comprising:

a vent opening; and a valve configured to permit escape of vapor from the fuel tank when the mower is in a substantially horizontal operating orientation and configured to prevent gasoline from passing through the vent when the fuel tank is maximally filled with gasoline when in the substantially horizontal operating orientation and while the deck is in the vertical orientation.

27. An apparatus comprising:

a gas powered walk behind mower comprising:

a deck;

a gas powered engine supported by the deck; and a rotating cutting blade driven by the gas powered engine, wherein the deck is configured to be stored in a generally vertical orientation without leaking of fluid contained in the gasoline powered engine, wherein the deck carries a plurality of wheels and wherein at least one of the wheels is elevated off ground when the deck is in the vertical orientation and wherein a handle extends substantially parallel to the deck when the deck is in the vertical orientation;

a mechanical latch actuatable between a locked state in which the latch locks the handle in a collapsed position along the deck and an unlocked state in which the handle is pivotable to an extended use position; and an actuator to actuate the latch between the locked state and the unlocked state, wherein the gas powered engine comprises:

a fuel tank having a vent to permit escape of vapor from the fuel tank when the mower is in a substantially horizontal operating orientation and wherein the fuel tank is configured to prevent gasoline from passing through the vent when the fuel tank is maximally filled with gasoline when in the substantially horizontal operating orientation and while the deck is in the vertical orientation;

a carburetor bowl configured to store a volume of gas between uses of the mower; and a bowl vent having a vent outlet located to extend above a level of the volume of gas when the deck is in the vertical orientation;

an oil sump, the sump comprising a passage through which a governor shaft extends, wherein the governor shaft passage is located below oil within the sump when the mower is stored with the deck in the vertical orientation; and a seal about the governor shaft passage inhibiting oil leakage from the sump through the passage.

* * * * *